(12) United States Patent
Agrawal et al.

(10) Patent No.: US 12,483,673 B2
(45) Date of Patent: Nov. 25, 2025

(54) REDUCING LOCAL BANDWIDTH USAGE FOR A VIDEO CALL HAVING MULTIPLE SECOND PARTICIPANTS BASED ON DIRECTED EYE GAZE OF THE LOCAL PARTICIPANT

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

( * ) Notice: Subject to any disclaimer, the term of this patent is extended or adjusted under 35 U.S.C. 154(b) by 173 days.

(21) Appl. No.: 18/392,676

(22) Filed: Dec. 21, 2023

(65) Prior Publication Data
US 2025/0211703 A1    Jun. 26, 2025

(51) Int. Cl.
*H04N 7/15* (2006.01)
*G06F 3/01* (2006.01)
*H04L 65/403* (2022.01)

(52) U.S. Cl.
CPC ............... *H04N 7/15* (2013.01); *G06F 3/013* (2013.01); *H04L 65/403* (2013.01); *H04N 7/155* (2013.01)

(58) Field of Classification Search
None
See application file for complete search history.

(56) References Cited

U.S. PATENT DOCUMENTS

| | | | |
|---|---|---|---|
| 10,623,634 B2 * | 4/2020 | Baran | H04N 21/21805 |
| 10,732,784 B2 * | 8/2020 | Siegelmann | G06F 3/04847 |
| 11,297,332 B1 * | 4/2022 | Walters | H04N 19/85 |
| 12,177,607 B2 * | 12/2024 | Avrunin | H04N 7/155 |
| 2007/0159523 A1 * | 7/2007 | Hillis | H04N 7/144 |
| | | | 348/E7.083 |

* cited by examiner

*Primary Examiner* — Quoc D Tran

(57) ABSTRACT

An electronic device, method and computer program product provide clear video feeds while operating within a data bandwidth limitation. The electronic system monitors eye gaze direction of a local participant viewing a display and positioned in a field of view of the at least one image capturing device. The electronic device receives, via a communications subsystem, and presents, at the display, more than one video feeds of respective participants in a video communication session. In response to determining that at least one video feed is not being gazed at by the local participant, the electronic system captures a video snippet of each of the at least one video feed and presents the video snippet within a participant tile in place of the respective video feed. The electronic system presents a live video feed in a corresponding participant tile that is being viewed by the local participant.

20 Claims, 10 Drawing Sheets

Rank each of the multiple second participants based on enumerated interactions between the local participant and the multiple second participants
916

Determine a local data throughput capacity of the video communication session
918

Identify, based on a respective rank of each of the multiple second participants, a first subset of the plurality of video feeds that collectively require less than the local data throughput capacity
920

Download the first subset of the more than one video feeds
922

Present the first subset of the more than one video feeds on the display
924

Present video snippets of a second subset of the more than one video feeds that have a lower rank than the first subset and that exceed the local data throughput capacity
926

( END )

*FIG. 9B* ic devices, laptops, and tablets are often used
REDUCING LOCAL BANDWIDTH USAGE FOR A VIDEO CALL HAVING MULTIPLE SECOND PARTICIPANTS BASED ON DIRECTED EYE GAZE OF THE LOCAL PARTICIPANT

BACKGROUND

1. Technical Field

The present disclosure relates generally to electronic systems with a graphical display, and more particularly to electronic systems with a graphical display that present video feeds from a video communication session.

2. Description of the Related Art

Electronic devices such as mobile phones, network servers, desktop workstations, laptops, and tablets are often used to participate in or to enable online human communication. So as to simulate an in-person conversation, meeting, or lecture, each participant in a video communication session generally positions themself within the field of view of the local camera and within detection range of the microphone. The respective image stream and audio stream of each participant are communicated to the video communication session for presentation by one or more second electronic devices. Unlike a one-way broadcast, a video communication session can include exchanges of audio, video, and data from each communication device to the other communication devices.

Video communication sessions, such as video conference calls, provide a virtual (online) venue for a meeting between a large number of participants. In response to a human need to see a clear video of the person(s) being spoken to, participant tiles present video feeds of remote participants. On a video communication session, data bandwidth can be limited, or the network quality can be poor. Receiving live video feeds from all of the remote participants can exceed the available data bandwidth of a local participant's device, causing obvious disruptions in the presentation of the video feeds that degrade the user experience.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 9A-9B (collectively "FIG. 9") are a flow diagram presenting a method for prioritizing clear video feed presentation of particular remote participants that are predicted as being more likely to be gazed at by the local participants, according to one or more embodiments.

DETAILED DESCRIPTION

Figure 1:
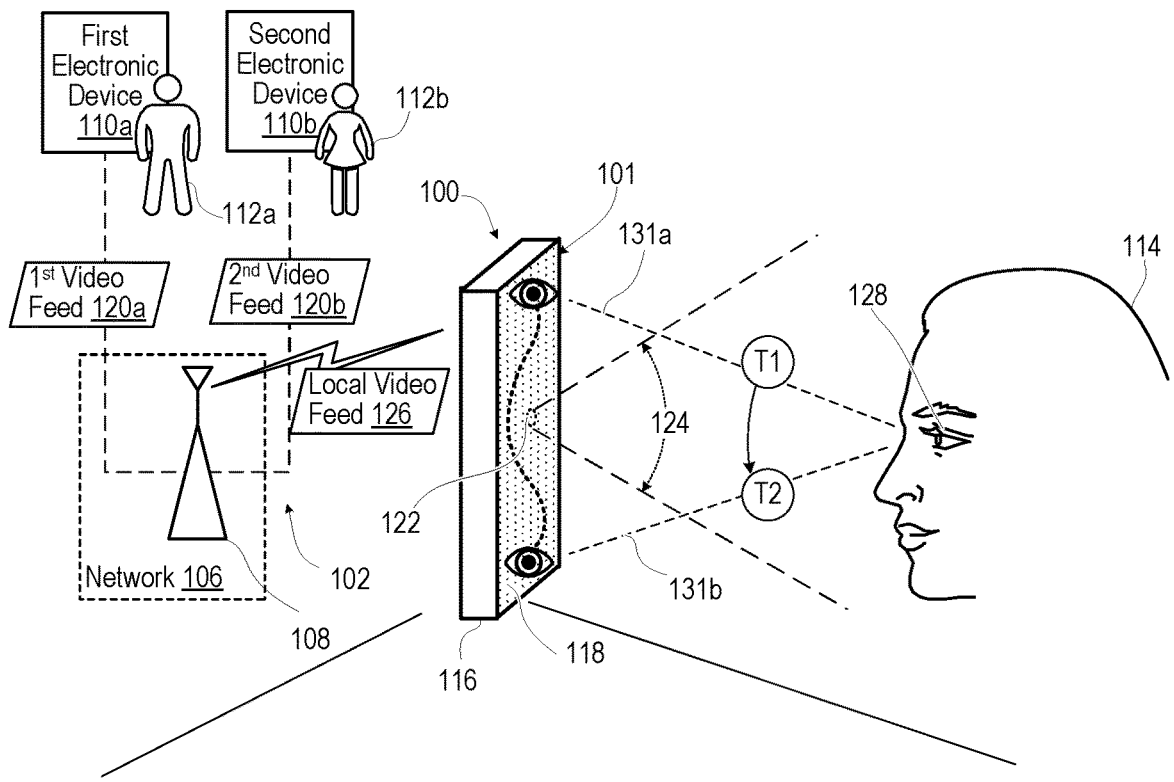
FIG. 1 presents a simplified functional block diagram and three-dimensional view an electronic system that controls display of video feeds in participant tiles of a video communication session using eye gaze automatic triggering, according to one or more embodiments.
Figure 1:
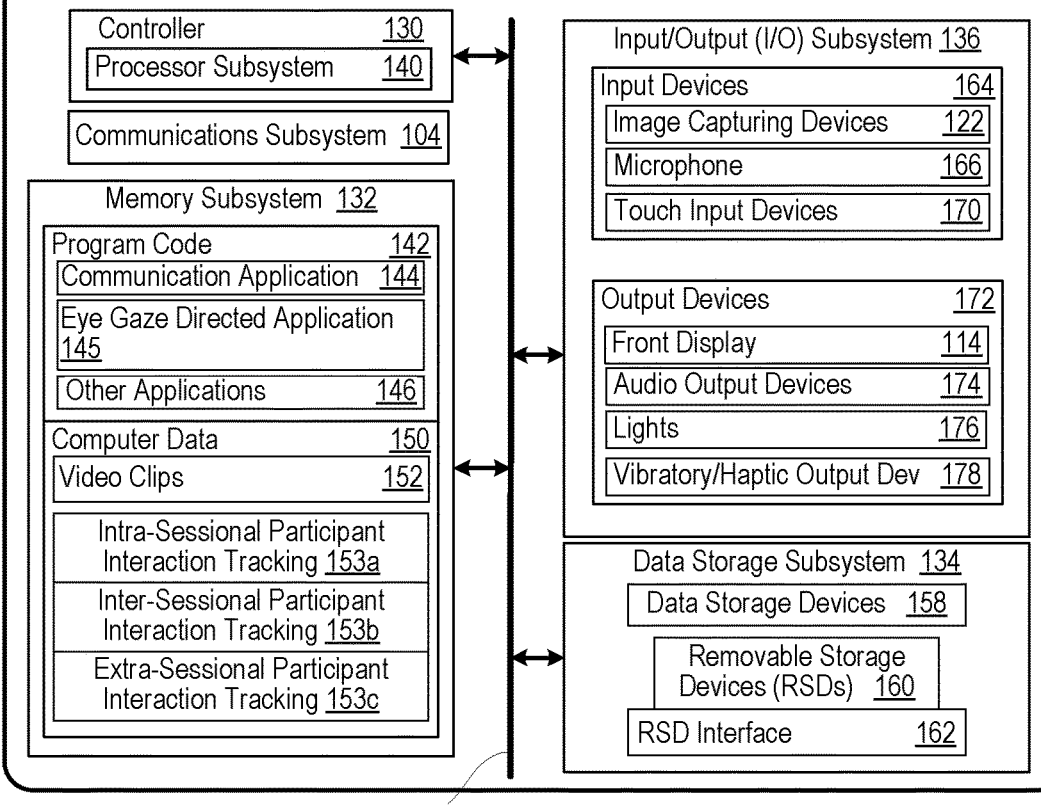

According to aspects of the present disclosure, an electronic system, a method, and a computer program product selectively presents live video feeds of remote participant(s) gazed at by a local participant. To operate within a data bandwidth limitation in support of a video communication session, the electronic system, method, and computer program product substitute recorded video snippets of other remote participant(s) that are not being gazed at. The video snippets provide an appearance, when not directly gazed at, of live video feeds to avoid degrading the user experience of the local participant. In one or more embodiments, the electronic system includes a communications subsystem that enables the electronic system to connect over a network to a video communication session with multiple electronic devices. The multiple electronic devices include at least a first electronic device and a second electronic device used respectively by a first participant and a second participant among multiple second participants to participate in the video communication session with a local participant. The electronic system includes a display that presents visual content. The electronic system includes at least one image capturing device that captures a field of view encompassing at least one eye of the local participant to the video communication session while the local participant is facing the visual content presented by the display. A controller of the electronic system is communicatively coupled to the communications subsystem, the display, and the at least one image capturing device. The controller monitors eye gaze direction of the local participant positioned in the field of view of the at least one image capturing device. The electronic system receives, via the communications subsystem, and presents, at the display, more than one video feeds of respective participants in the video communication session. In response to determining that at least one video feed is not being gazed at by the local participant, the electronic system: (i) captures a video snippet of each of the at least one video feed; and (ii) presents the video snippet within a participant tile in place of the respective video feed.

With more advanced eye tracking techniques available with electronic devices used in video communication sessions, such as smart phones, there is an opportunity, involving the use of eye gaze detection, to improve the user experience for viewing a video communication session in a local environment that has limited data bandwidth. The controller of the electronic device determines that a local participant or user is engaged in a video call with more than a threshold number of remote second participants. The controller determines if the current network condition associated with the electronic device satisfies at least one condition of the following: (i) bandwidth is below a threshold bandwidth; (ii) the electronic device is using a cellular data connection; (iii) the user has enabled hotspot connectivity in the electronic device in which the video call is running; or (iv) the user has turned video call data savings mode "ON". In an example, whenever the user has turned ON video call data savings mode, a smart video loop is recorded for each video feed received from remote second participants at the electronic device. The controller determines a targeted participant presented in a corresponding participant tile which has the user's attention by using the camera system of the electronic device to monitor the user's eye gaze to detect which specific area or display grid of the display is being viewed. The controller determines whether the gazed upon specific area corresponds to a specific remote second participant (i.e., a "targeted participant"). In one or more embodiments, the controller also determines whether the user is speaking or listening. In scenarios where the user is speaking to a particular participant (as identified by the words spoken and/or context of the conversation), the controller may play the live video feed for only the targeted participant and switch to presenting a smart video loop for the rest of the second participants. In scenarios where the user is listening, the controller may play the live video feed only for the targeted participant as well as the current speaker and switch to presenting the smart video loop for the rest of the second participants. The "pre-recorded" video segment that is the smart video loop would be used in lieu of a live video segment, reducing the maximum overall local bandwidth needs of the video communication session. The pre-recorded video segment may be refreshed after a threshold amount of time (e.g., 60 seconds) so that the same segment does not loop over and over during the video communication session.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of electronic system 100 that includes or is wholly provided by an electronic device, in which the features of the present disclosure are advantageously implemented. In one or more embodiments, electronic system 100 is implemented with additional communications functionality as a communication system that includes, or is wholly constituted as, communication device 101 that operates as a mobile user device in communication environment 102. Communication device 101 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices.

In an example, communication device 101 includes communications subsystem 104 that enables electronic system 100 to connect over network 106, which includes node 108, to a video communication session with at least first electronic device 110a and second electronic device 110b used respectively by remote first participant 112a and second participant 112b, among multiple second participants, to participate in the video communication session with local participant 114. Node 108 may represent a wireless access point, a cellular radio access network, a wired network interface, an over-the-air relay or repeater, or other communication link. Electronic system 100 includes display 116 that presents visual content 118 in support of the video communication session. In an example, display 116 is an integral display of communication device 101. Visual content 118 may be based at least in part of first and second remote video feeds 120a-120b of first and second participants 112a-112b received respectively from first and second electronic devices 110a-110b via communications subsystem 104. Electronic system 100 includes at least one image capturing device 122. In an example, communication device 101 includes image capturing device 122 that is integral and oriented beside or behind display 116 (e.g., camera under display (CUD)) and captures field of view 124 encompassing local participant 114 who is facing visual content 118 presented by display 116. Image capturing device 122 may generate local video feed 126 of local participant 114 that is communicated, via communications subsystem 104, to the video communication session via node 108 to first and second electronic devices 110a-110b. Image capturing device 122 also captures eye gaze direction 131a-131b of at least one eye 128 of local participant 114. Controller 130 of electronic system 100 is communicatively coupled to display 116 and to at least one image capturing device 122. Controller 130 controls presentation of first and second remote video feeds 120a-120b based on eye gaze direction 131a-131b at first and second times ("T1" and "T2") respectively to selectively turn off receipt of at least one of first and second remote video feeds 120a-120b and reduce data bandwidth usage of communication device 101 without degrading user experience of local participant 114. In one embodiment, the selective receipt of less than the total complement of remote video feeds of second participants can be based on dynamic mitigation of data throughput limitations detected from network 106.

Figure 2:
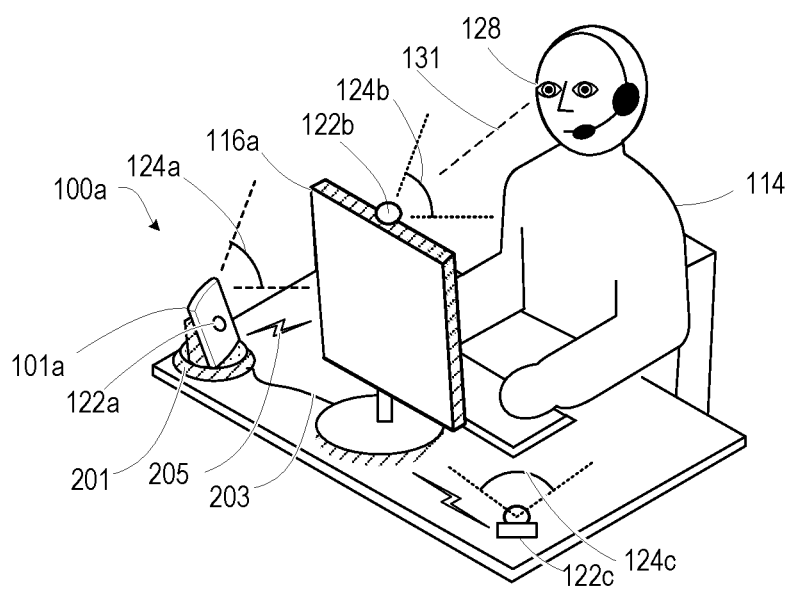
FIG. 2 is a three-dimensional view of an example electronic system of a mobile communication device and an external display providing gaze directed presentation of visual content of a video communication session to a local participant, according to one or more embodiments.

FIG. 2 is a three-dimensional view of example electronic system 100a that includes communication device 101a implemented as a handheld mobile device that is placed in dock 201. Dock 201 may provide electrical power to communication device 101a. Dock 201 may provide wired link 203 to external display 116a that presents visual content 118 (FIG. 1) to local participant 114. Alternatively, or in addition, communication device 101a may be communicatively coupled via wireless link 205 to external display 116a. Local participant 114 is positioned in front of external display 116a with at least one eye 128 gazing toward visual content 118 (FIG. 1). Dock 201 may provide physical positioning of communication device 101a to orient field of view 124a of image capturing device 122a toward local participant 114 for monitoring at least one eye 128. In an example, communication device 101a may be oriented to position a back camera as image capturing device 122a toward local participant 114. In another example, communication device 101a may be oriented to position a front camera as image capturing device 122a toward local participant 114. Controller 130 identifies field of view 124a relative to external display 116a to identify eye gaze direction 131 relative to visual content 118 (FIG. 1). Alternatively, or in addition, external display 116a may include image capturing device 122b having a field of view 124b that is aligned with external display 116a. Alternatively, or in addition, stand-alone image capturing device 122c may be a separate device from communications device 101a and external display 116a and have field of view 124c aligned to capture the face of user.

With continued reference to FIG. 1, in addition to communications subsystem 104 and controller 130, communication device 101 may include memory subsystem 132, data storage subsystem 134 and input/output (I/O) subsystem 136. To enable management by controller 130, system interlink 138 communicatively connects controller 130 with communications subsystem 104, memory subsystem 132, data storage subsystem 134 and I/O subsystem 136. System interlink 138 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 138) are illustrated in FIG. 1, it is to be understood that more, fewer, or different interconnections may be present in other embodiments.

Controller 130 includes processor subsystem 140, which includes one or more central processing units (CPUs) or data processors. Processor subsystem 140 can include one or more digital signal processors that can be integrated with data processor(s). Processor subsystem 140 can include other processors such as auxiliary processor(s) that may act as a low power consumption, always-on sensor hub for physical sensors. Controller 130 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Controller 130 may include various functionality that enables controller 130 to perform different aspects of artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output. In an example, AI modules may determine a data throughput limitation such as network interruptions or a current resource allocation that triggers video call data saving mode. In another example, AI modules may recognize that selectively presenting live video feeds along with recorded video snippets is enabled for other purposes such as to emphasize particular participants. AI modules may determine which participants should be presented or not in a live video feed.

Memory subsystem 132 stores program code 142 for execution by processor subsystem 140 to provide the functionality described herein. Program code 142 includes applications such as communication application 144 that facilitates video communication session. Program code 142 may include eye gaze directed module 145 and other applications 146. These applications/modules may be software or firmware that, when executed by controller 130, configures communication device 101 to provide functionality described herein. In an example, eye gaze directed module 145 may use eye gaze direction to mitigate data throughput limitations of network 106 without degrading user experience of local participant 114. Eye gaze directed module 145 may use eye gaze direction for alternate or additional benefits when not required to mitigate data throughput limitations of network 106. In an example, live video feeds are provided to suggest particular remote participants that local participant 114 should gaze at. In one or more embodiments, several of the described aspects of the present disclosure are provided via executable program code of applications executed by controller 130. In one or more embodiments, program code 142 may be integrated into a distinct chipset or hardware module as firmware that operates separately from executable program code. Portions of program code 142 may be incorporated into different hardware components that operate in a distributed or collaborative manner. Memory subsystem 132 further includes operating system (OS), firmware interface, such as basic input/output system (BIOS) or Uniform Extensible Firmware Interface (UEFI), and firmware, which also includes and may thus be considered as program code 142.

Program code 142 may access, use, generate, modify, store, or communicate computer data 150, such as visual content data 152 that may be used to present visual content 118. In another example, computer data 150 may include intra-sessional participant interaction tracking data 153a, inter-sessional participant interaction tracking data 153b, and extra-sessional participant interaction tracking data 153c. Eye gaze directed module 145 generates and maintains intra-sessional participant interaction tracking data 153a by identifying instances in which local participant 114 views or chats with second participants 112a-112b. Eye gaze directed module 145 generates and maintains inter-sessional participant interaction tracking data 153a by identifying instances in which local participant 114 views or chats with second participants 112a-112b in previous video communication sessions. Eye gaze directed module 145 generates and maintains extra-sessional participant interaction tracking data 153a by identifying associations between second participants 112a-112b and local participants 114 that imply interactions. In an example, a particular one of second participants 112a-112b and local participant 114 can be in a direct supervisory relationship or belong to a peer group that indicates an association that can be used to input a number of interactions. In an example, having a supervisory-subordinate relationship may impute an equivalent interaction to ten (10) gaze directed interactions during a current video communication session. In an example, being associated in the same peer-related group may impute an equivalent interaction of five (5) gaze directed interactions during a current video communication session.

Computer data 150 may incorporate "data" that originated as raw, real-world "analog" information that consists of basic facts and figures. Computer data 150 includes different forms of data, such as numerical data, images, coding, notes, and financial data. Computer data 150 may originate at communication device 101 or be retrieved from a remote device via communications subsystem 104. Communication device 101 may store, modify, present, or transmit computer data 150 such as visual content data 152. Computer data 150 may be organized in one of a number of different data structures. Common examples of computer data 150 include video, graphics, text, and images. Computer data 150 can also be in other forms of flat files, databases, and other data structures.

Data storage subsystem 134 of communication device 101 includes data storage device(s) 158. Controller 130 is communicatively connected, via system interlink 138, to data storage device(s) 158. Data storage subsystem 134 provides program code 142 and computer data 150 stored on non-volatile storage that is accessible by controller 130. For example, data storage subsystem 134 can provide a selection of program code 142 and computer data 150. These applications can be loaded into memory subsystem 132 for execution/processing by controller 130. In one or more embodiments, data storage device(s) 158 can include hard disk drives (HDDs), optical disk drives, and/or solid-state drives (SSDs), etc. Data storage subsystem 134 of communication device 101 can include removable storage device(s) (RSD(s)) 160, which is received in RSD interface 162. Controller 130 is communicatively connected to RSD 160, via system interlink 138 and RSD interface 162. In one or more embodiments, RSD 160 is a non-transitory computer program product or computer readable storage device that may be executed by a processor associated with a user device such as communication device 101. Controller 130 can access data storage device(s) 158 or RSD 160 to provision communication device 101 with program code 142 and computer data 150.

I/O subsystem 136 may include input devices 164 such as image capturing device(s) 122, microphone 166, and touch input devices 170 (e.g., screens, keys, or buttons). I/O subsystem 136 may include output devices 172 such as display 116, audio output devices 174, lights 176, and vibratory or haptic output devices 178.

In one or more embodiments, controller 130, via communications subsystem 104, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 104 includes a global positioning system (GPS) module that receives GPS broadcasts from GPS satellites to obtain geospatial location information. In one or more embodiments, controller 130, via communications subsystem 104, communicates via a wireless local area network (WLAN) link using one or more IEEE 802.11 WLAN protocols with an access point. In one or more embodiments, controller 130, via communications subsystem 104, may communicate via an OTA cellular connection with radio access networks (RANs). In an example, communication device 101, via communications subsystem 104, connects via RANs of a terrestrial network that is communicatively connected to a network server.

Figure 3:
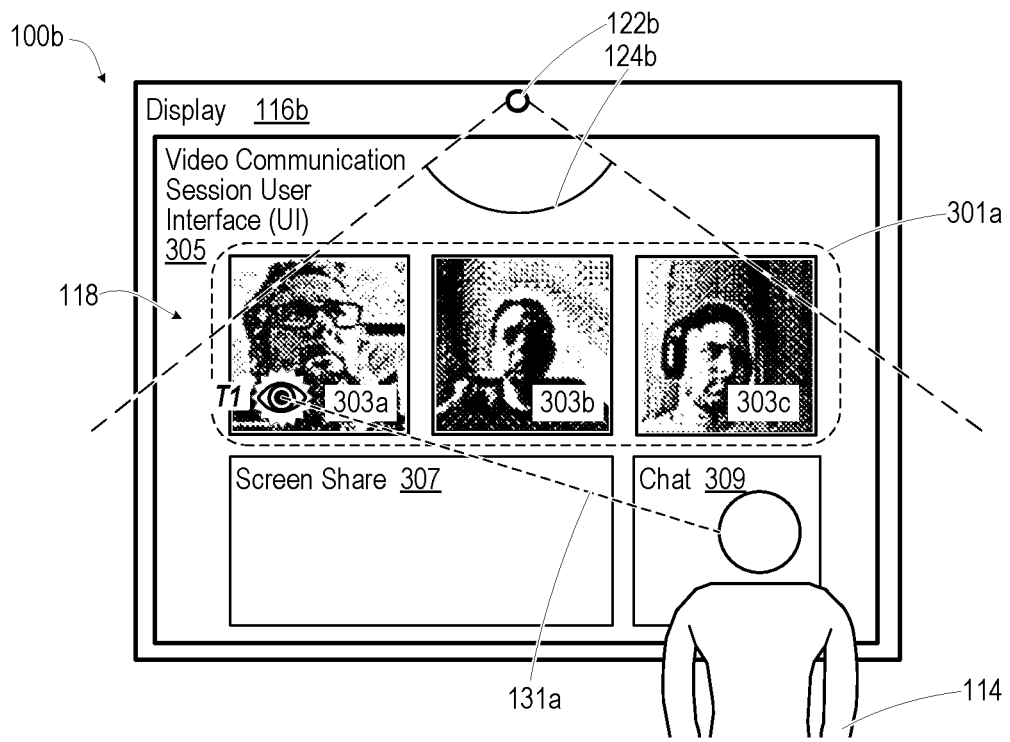
FIG. 3 is a front view of an example display presenting a partial gallery of participant tiles in support of a video communication session, according to one or more embodiments.

FIG. 3 presents display 116b of electronic system 100b presenting partial gallery 301a of participant tiles 303a, 303b and 303c of three remote participants as visual content 118 of a video communication session. Display 116b may be an integral display of communication device 101 (FIG. 1) or an external display 116a (FIG. 2). Display 116b includes image capturing device 122b having field of view 124b that is aligned to capture a space from which local participant 114 can view presentation of visual content 118. Local participant 114 has eye gaze direction 131a directed at first participant tile 303a of visual content 118. Displaying partial gallery 301a allows a portion of user interface 305 of video communication session to be used for other visual content 118 such as screen share window 307 and chat window 309.

Figure 4:
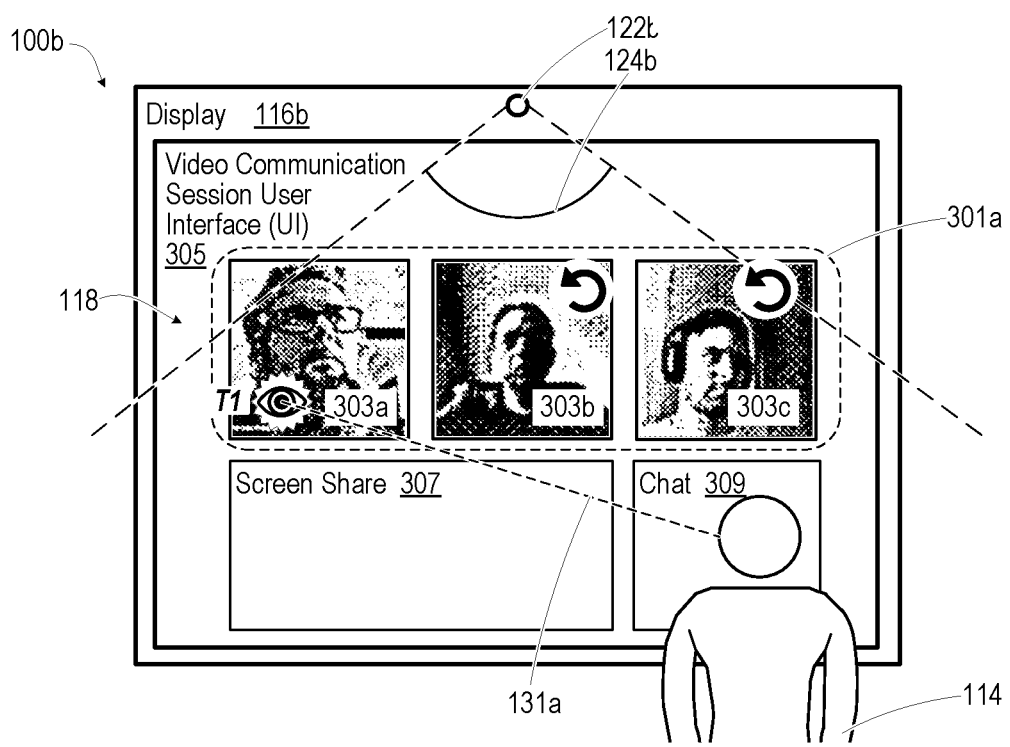
FIG. 4 is a front view of the example display of FIG. 3 presenting the partial gallery of participant tiles with mitigation for data throughput limitations by presenting recorded video segments for participant tiles not being gaze at by the local participant, according to one or more embodiments.

FIG. 4 presents display 116 of FIG. 3 presenting partial gallery 301a of participant tiles 303a, 303b and 303c. In response to detecting eye gaze direction 131a of local participant 114 at first participant tile 303a, controller presents a live video feed of the first remote participant at first participant tile 303a, while presenting recorded video segments of the second and third remote participants respectively within second and third participant tiles 303b-303c. In one or more embodiments, controller performs the aforementioned processes in order to mitigate data throughput limitations of the network connection of the local electronic system. In one or more embodiments, controller 130 (FIG. 1) periodically re-records a current, more recent version of each video snippet of respective participants in the video communication session and presents the more recent version of the video snippet at the particular participant tile in order to imitate a live video feed.

In one or more embodiments, controller 130 (FIG. 1) tracks interactions between local participant 114 and the multiple second participants. In an example, a number of chat messages in chat window 309 may indicate the interactions. In response to identifying that local participant 114 is directly interacting with the first participant but not the second participant, controller 130 (FIG. 1) presents a live video feed of first participant 112a (FIG. 1) and presents the video snippet of second participant 112b (FIG. 1). In one or more particular embodiments, controller 130 (FIG. 1) enumerates interactions between local participant 114 and each of the multiple second participants (e.g., first and second participants 112a-112b). Controller 130 (FIG. 1) ranks each of the multiple second participants based on the enumerated interactions as an indication of likelihood that local participant 114 would gaze at each of the multiple second participants. Controller 130 (FIG. 1) determines a local bandwidth capacity of the video communication session. Based on a respective rank of each of the multiple second participants, controller 130 (FIG. 1) selectively presents only a first subset of the more than one video feeds, where the first subset collectively requires less than the local bandwidth capacity. Controller 130 (FIG. 1) presents video snippets of a second subset of the more than one video feeds that have a lower rank than the first subset and that may cause the video downloads of all of the more than one video feeds to exceed the local bandwidth capacity. In one or more embodiments, in response to determining that video call data savings mode is enabled, controller 130 (FIG. 1) records each video snippet from the more than one video feeds of respective participants in the video communication session. Alternatively, or in addition, the video call data savings mode may be automatically or manually triggered for reasons other than data throughput limitations such as to emphasize video feeds of selected participants. In an example, a participant may be the active speaker, the designated lecturer, a host of a conference, a high-ranking delegate, etc., that local participant 114 should gaze at.

Figure 5:
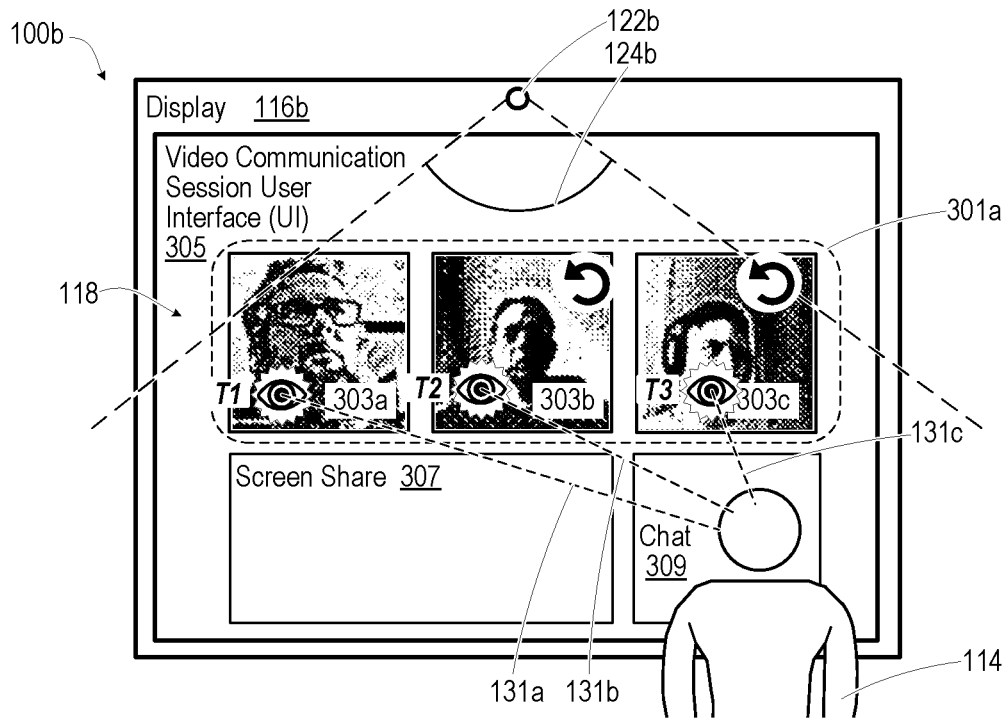
FIG. 5 is a front view of the example display of FIG. 4 presenting the partial gallery with eye gaze direction of the local participant detected as scanning across a series of the participant tiles, according to one or more embodiments.
Figure 6:
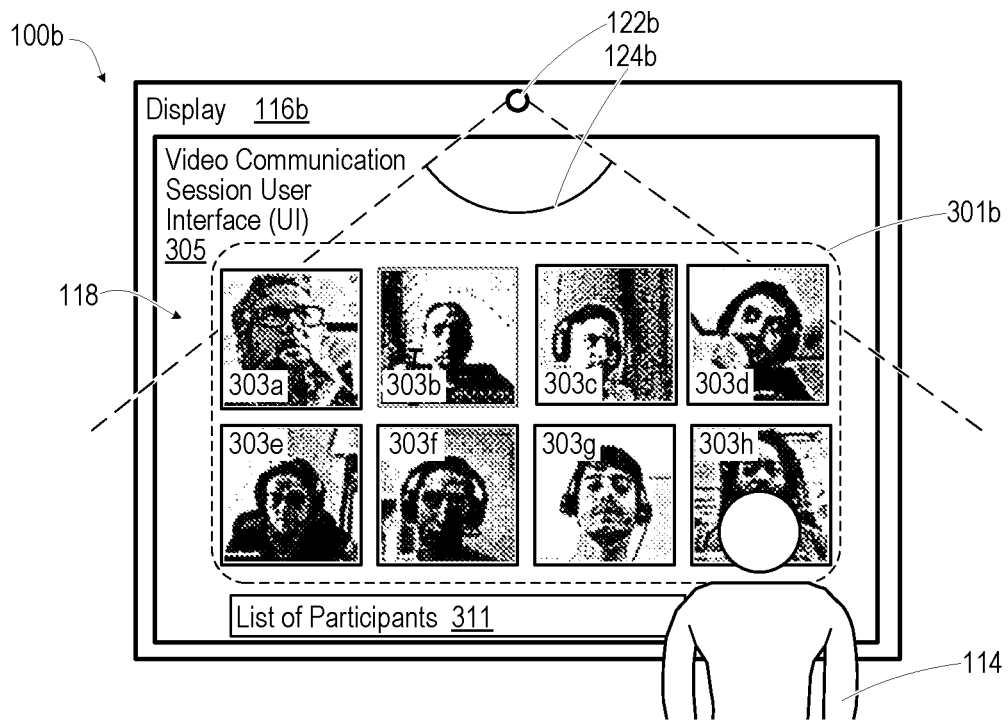
FIG. 6 is a front view of the example display of FIG. 5 presenting a full gallery of the plurality of the participant tiles and a full listing of the remote participants in response to detecting the scanning by the local participant, according to one or more embodiments.

FIG. 5 presents display 116 of FIG. 4 presenting partial gallery 301a with eye gaze direction 131a, 131b and 131c of local participant 114 detected as scanning across a series of participant tiles 303a, 303b and 303c respectively. FIG. 6 presents display 116 of FIG. 5 presenting full gallery 301b of the plurality of the participant tiles 303a, 303b, 303c, 303d, 303e, 303f, 303g and 303h and/or full listing 311 of the remote participants in response to detecting the scanning by local participant 114. In an example, settings, available display space, and/or the number of remote participants may dictate presenting only one of full gallery 301b or full listing 311. In another example, full listing 311 may be segregated to a portion of display 116, as depicted, until gazed at by local participant 114, resulting in an expanded size full listing 311. Gazing at a particular name or thumbnail contained in full listing 311 may result in presentation of a corresponding live video feed in a corresponding participant tile.

Figure 7A:
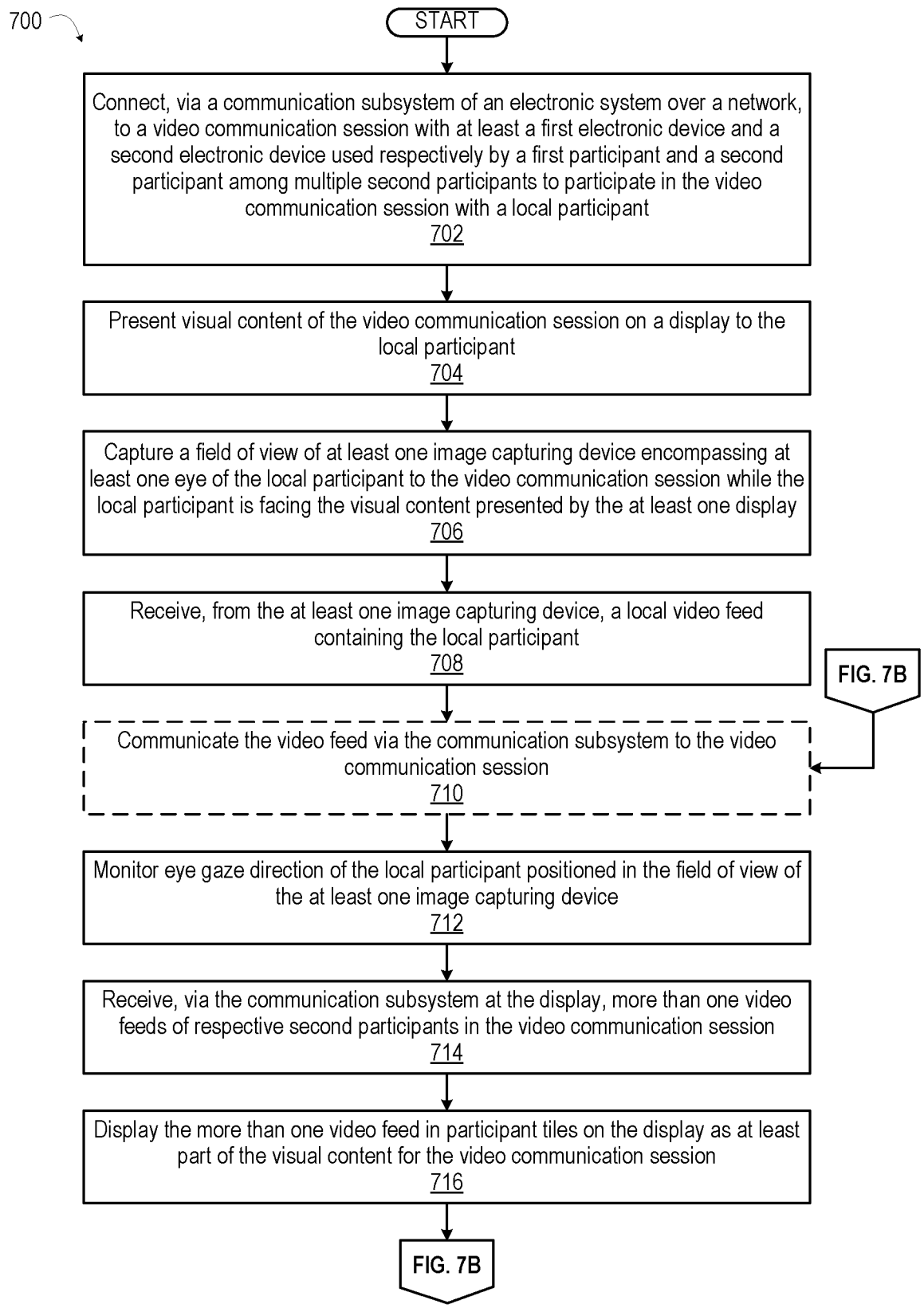
FIGS. 7A-7C (collectively "FIG. 7") are a flow diagram presenting a method of reducing data bandwidth used to support a video communication session without degrading, replacing, or removing a live video feed presented for a remote participant being viewed by a local participant, according to one or more embodiments.
Figure 7B:
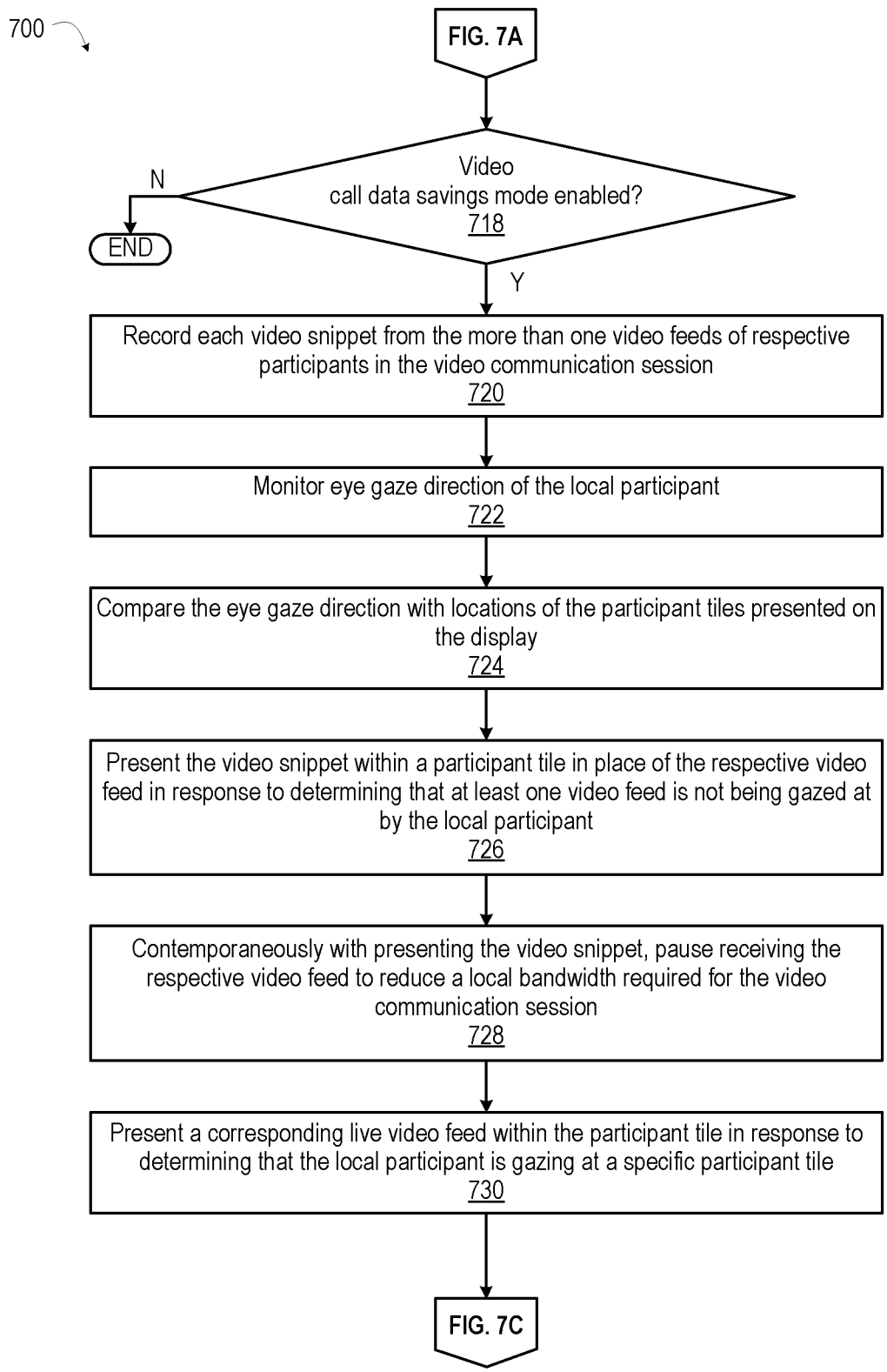
Figure 7C:
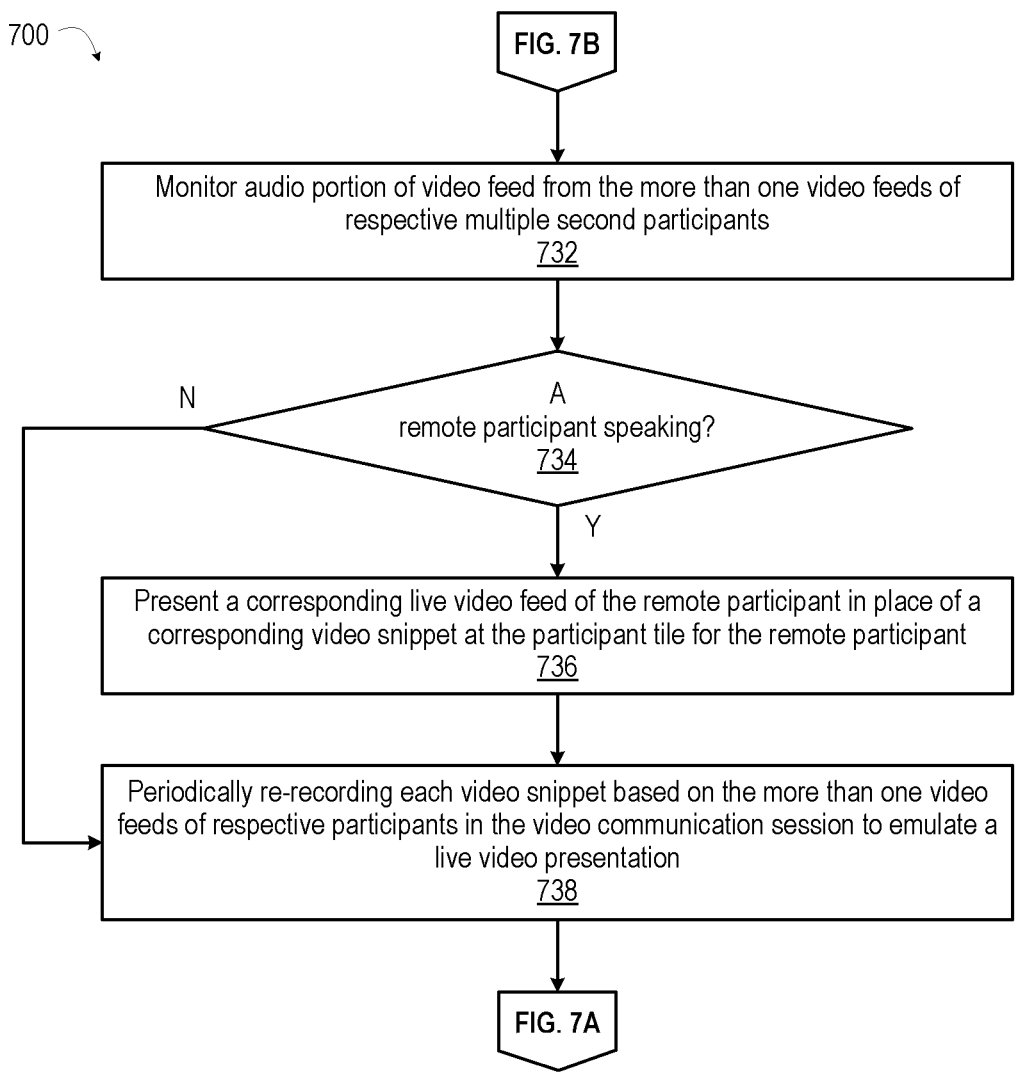
Figure 8:
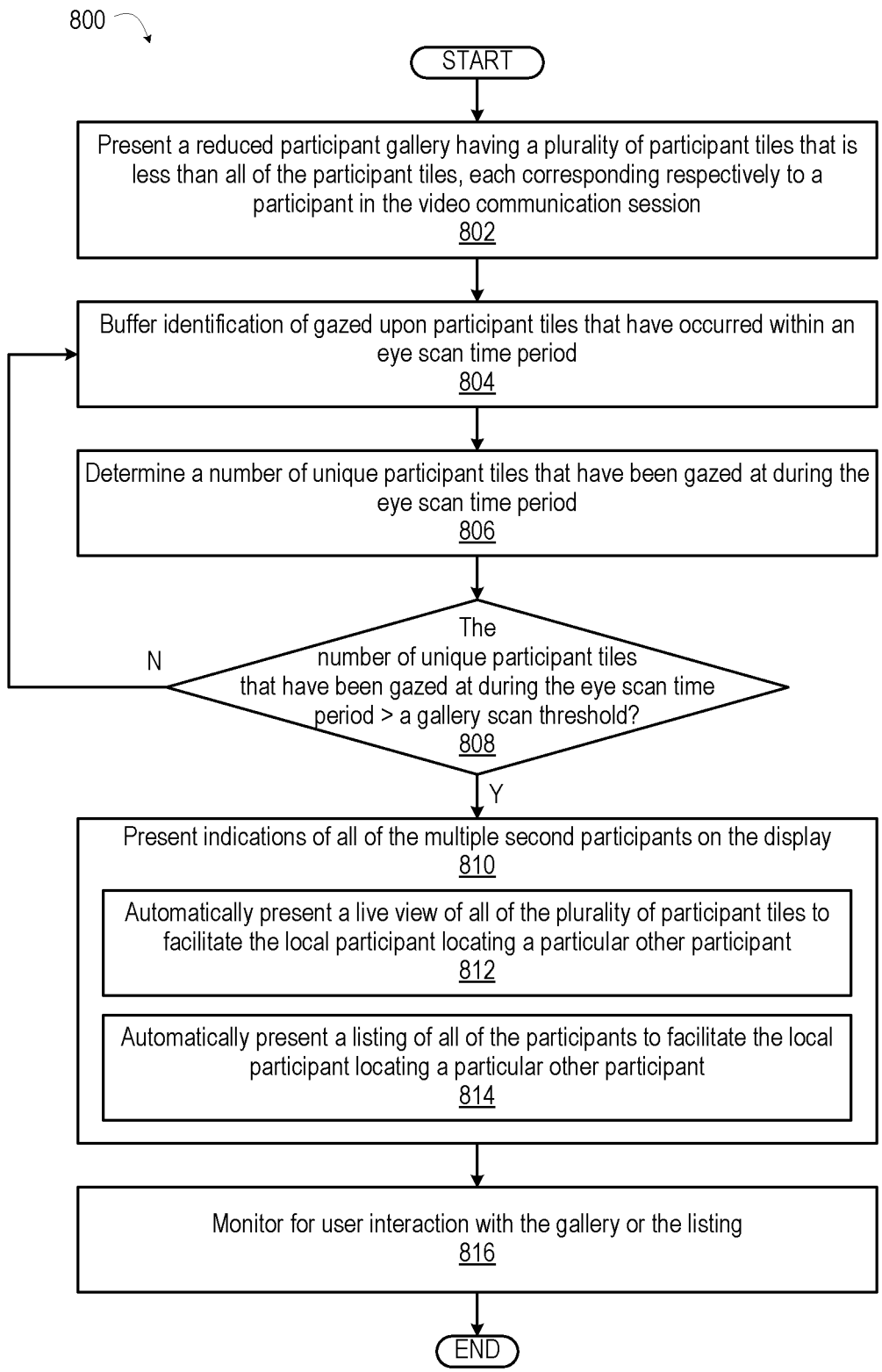
FIG. 8 is a flow diagram presenting a method for automatic gaze directed switching to a full gallery or full participant listing from a partial gallery presentation, according to one or more embodiments.
Figure 9A:
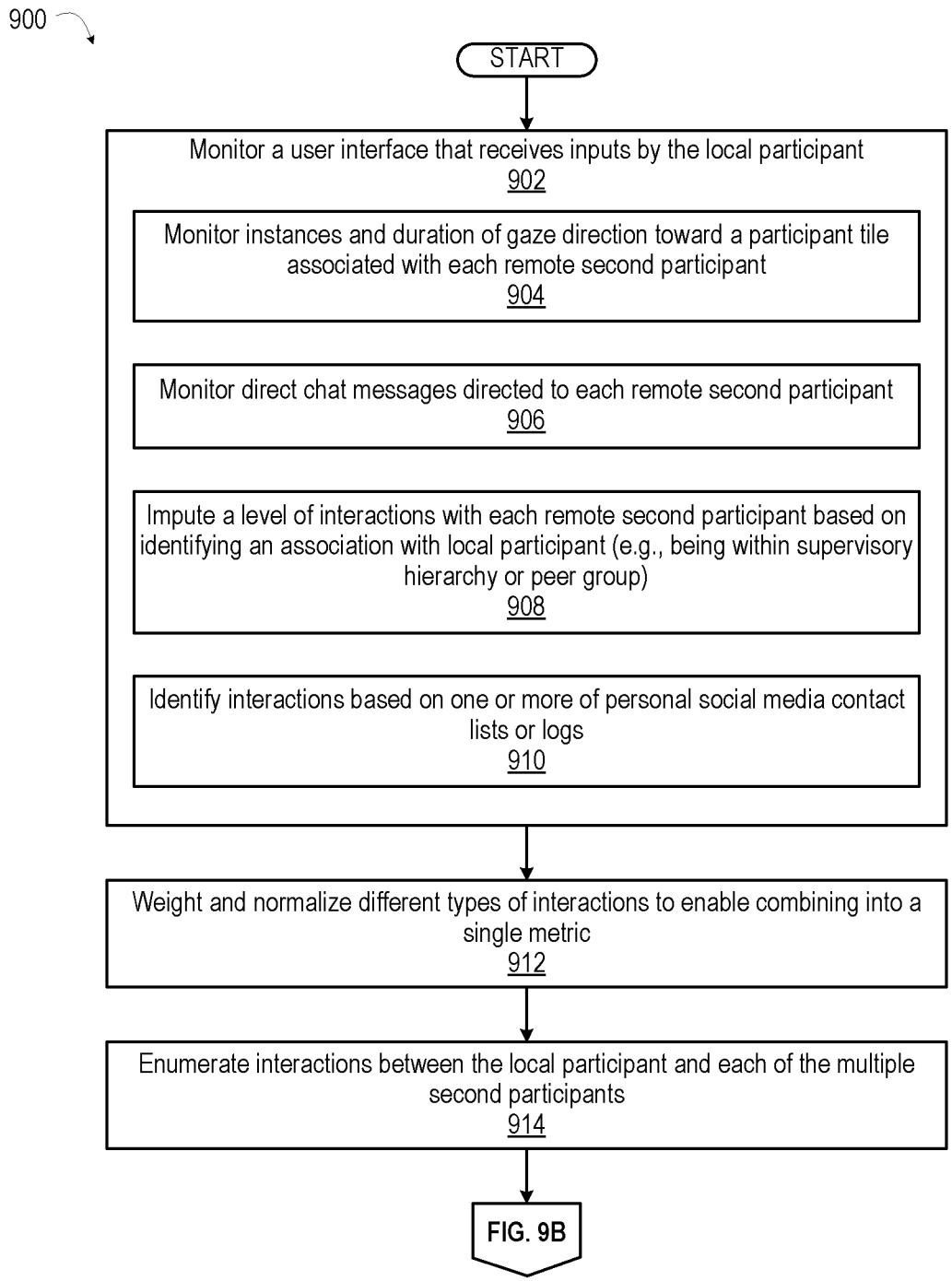

FIGS. 7A-7C (collectively "FIG. 7") are a flow diagram presenting method 700 of reducing data bandwidth used to support a video communication session without degrading, replacing, or removing a live video feed presented for a remote participant being viewed by a local participant. FIG. 8 is a flow diagram presenting method 800 for automatic gaze directed switching to a full gallery or full participant listing from a partial gallery presentation. FIGS. 9A-9B (collectively "FIG. 9") are a flow diagram presenting method 900 for prioritizing live video feed presentation of particular remote participants that are predicted as being more likely to be gazed at by the local participants. Method 800 (FIG. 8) and method 900 (FIG. 9) may augment the functionality of method 700 (FIG. 7). The descriptions of method 700 (FIG. 7), method 800 (FIG. 8), and method 900 (FIG. 9) are provided with general reference to the specific components illustrated within the preceding FIGS. 1-6. Specific components referenced in method 700 (FIG. 7), method 800 (FIG. 8) and method 900 (FIG. 9) may be identical or similar to components of the same name used in describing preceding FIGS. 1-6. In one or more embodiments, controller 130 (FIG. 1) configures communication device 101 (FIG. 1) and communication device 101a (FIG. 2) or a similar computing device to provide the described functionality of method 700 (FIG. 7), method 800 (FIG. 8), and method 900 (FIG. 9).

With reference to FIG. 7A, method 700 includes connecting over a network, via a communications subsystem of an electronic system, to a video communication session with at least a first electronic device and a second electronic device used respectively by a first participant and a second participant among multiple second participants to participate in the video communication session with a local participant (block 702). Method 700 includes presenting visual content of the video communication session on a display to the local participant, the visual content including participant tiles for presenting a video or image for each participant in the video communication session (block 704). Method 700 includes capturing a field of view of at least one image capturing device encompassing at least one eye of the local participant to the video communication session while the local participant is facing the visual content presented by the display (block 706). Method 700 includes receiving, from the at least one image capturing device, a local video feed containing the local participant (block 708). Method 700 optionally includes communicating the local video feed via the communications subsystem to the video communication session (block 710). The local participant may disable generating or communicating the local video feed. Method 700 includes monitoring eye gaze direction of the local participant positioned in the field of view of the at least one image capturing device (block 712). Method 700 includes receiving, via the communications subsystem at the display, more than one video feeds of respective second participants in the video communication session (block 714). Method 700 includes displaying the more than one video feed in participant tiles on the display as at least part of the visual content for the video communication session (block 716). Method 700 proceeds to decision block 718 of FIG. 7B.

With reference to FIG. 7B, method 700 includes determining whether video call data savings mode is enabled (decision block 718). In response to determining that video call data savings mode is not enabled (i.e., disabled), method 700 ends. In response to determining that video call data savings mode is enabled, method 700 includes recording a video snippet from each of the more than one video feeds of respective participants in the video communication session (block 720). Method 700 includes monitoring eye gaze direction of the local participant (block 722). Method 700 includes comparing the eye gaze direction with locations of the participant tiles presented on the display (block 724). Method 700 includes presenting the video snippet within a participant tile in place of the respective video feed in response to determining that a corresponding video feed is not being gazed at by the local participant (block 726). Method 700 includes, contemporaneously with presenting the video snippet, pausing receiving of the respective video feed to reduce a local bandwidth required for the video communication session (block 728). Method 700 includes presenting a corresponding live video feed within the participant tile in response to determining that the local participant is gazing at a specific participant tile (block 730). Method 700 proceeds to decision block 732 of FIG. 7C.

With reference to FIG. 7C, method 700 includes monitoring an audio portion of video feeds from the more than one video feeds of respective multiple second participants (block 732). Method 700 includes determining whether a remote participant is speaking (decision block 734). In response to determining that a remote participant is speaking, method 700 includes presenting a corresponding live video feed of the remote participant at the participant tile for the remote participant (block 736). In one or more embodiments, method 700 replaces a corresponding video snippet with the live video feed when the speaking participant transitions from a non-speaking participant who was not being looked (gazed) at by the local participant. Method 700 includes periodically re-recording each video snippet from the more than one live video feeds of respective participants in the video communication session to emulate a live video presentation (block 738). Then method 700 returns to block 708 (FIG. 7A).

In one or more embodiments, a first electronic device includes the display and a memory that stores a universal device controller client. A second electronic device includes a controller, the communications subsystem, and a memory communicatively coupled to the controller and that stores a universal device controller application. Method 700 may further include presenting the visual content on the display to the local participant further by executing the universal device controller application by the controller of a second electronic device to configure the communications subsystem to support a communication exchange with the first electronic device having the display and which executes the universal device controller client. Method 700 may further include triggering, via the communication exchange, the first electronic device to present the visual content.

With reference to FIG. 8, method 800 includes presenting a reduced participant gallery having a plurality of participant tiles that is less than all of the participant tiles, each corresponding respectively to a participant in the video communication session (block 802). Method 800 includes buffering identification of gazed upon participant tiles that have occurred within an eye scan time period (block 804). As an example, eye scan time period may be 2 seconds, 3 seconds, 4 seconds, 5 seconds, or longer. Method 800 includes determining a number of unique participant tiles that have been gazed at during the eye scan time period (block 806). Method 800 includes determining whether the number of unique participant tiles that have been gazed at during the eye scan time period is greater than a gallery scan threshold (decision block 808). As an example, the gallery scan threshold may be 2, 3, 4 or more. The gallery scan threshold may be empirically determined and set to correspond to a local participant searching for one or more known remote second participants. In response to determining that the number of unique participant tiles that have been gazed at during the eye scan time period is not greater (i.e., equal to or less) than a gallery scan threshold, method 800 returns to block 804. In response to determining that the number of unique participant tiles that have been gazed at during the eye scan time period is greater than a gallery scan threshold, method 800 includes presenting indications of all of the multiple second participants on the display (block 810). In an example, method 800 includes automatically presenting a live view of all of the plurality of participant tiles to facilitate the local participant locating a particular other participant (block 812). Alternatively, or in addition, method 800 includes automatically presenting a listing of all of the participants to facilitate the local participant locating a particular other participant (block 814). Method includes monitoring for user interaction with the gallery or the listing (block 816). Then method 800 ends.

With reference to FIG. 9A, method 900 includes monitoring a user interface that receives inputs by the local participant (block 902). In an example, method 900 includes monitoring instances and duration of gaze direction toward a participant tile associated with each remote second participant (block 904). Alternatively, or in addition, method 900 includes monitoring direct chat messages directed to each remote second participant (block 906). In an example, gaze direction chat interactions may be within a current communication session or be within multiple communication sessions (i.e., intra-sessional or inter-sessional participant interaction tracking data, respectively). Alternatively, or in addition, method 900 includes imputing a level of interactions with each remote second participant based on identifying a close association (e.g., being within supervisory hierarchy or peer group) based on extra-sessional participant interaction tracking data (block 908). Alternatively, or in addition, method 900 includes identifying interactions based on one or more of personal social media contact lists or logs (block 910). In one or more embodiments, method 900 may include weighting and normalizing different types of interactions obtained via blocks 902, 904, 906, 908, and 910 to enable combining into a single metric (block 912). Method 900 includes enumerating interactions between the local participant and each of the multiple second participants (block 914). In an example, glances of less than a second toward a second participant may be enumerated as one count. Staring at a second participant for more than two seconds may be enumerated as two counts. Sending an instant message chat to a second participant may be enumerated as ten counts. Then method 900 proceeds to block 916 of FIG. 9B.

With reference to FIG. 9B, method 800 includes ranking each of the multiple second participants based on enumerated interactions between the local participant and the multiple second participants (block 916). More interactions generally correlates to a higher ranking. Method 800 includes determining a local data throughput capacity of the video communication session (block 918). Method 800 includes identifying, based on a respective rank of each of the multiple second participants, a first subset of the plurality of video feeds that collectively require less than the local bandwidth capacity (block 920). Method 900 includes downloading the first subset of the more than one video feeds (block 922). Method 900 includes presenting the first subset of the more than one video feeds on the display (block 924). Method 900 includes presenting video snippets of a second subset of the more than one video feeds that have a lower rank than the first subset and that exceed the local data throughput capacity (block 926). Then method 900 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic system comprising:
    a communications subsystem that enables the electronic system to connect over a network to a video communication session with at least a first electronic device and a second electronic device used respectively by a first participant and a second participant among multiple second participants to participate in the video communication session with a local participant;
    a display that presents visual content;
    at least one image capturing device that captures a field of view encompassing at least one eye of the local participant to the video communication session while the local participant is facing the visual content presented by the display; and
    a controller communicatively coupled to the communications subsystem, the display, and the at least one image capturing device, and which:
        monitors eye gaze direction of the local participant positioned in the field of view of the at least one image capturing device;
        receives, via the communications subsystem, and presents, at the display, more than one video feeds of respective participants in the video communication session; and
        in response to determining that at least one video feed is not being gazed at by the local participant:
            captures a video snippet of each of the at least one video feed; and
            presents the video snippet within a participant tile in place of the respective video feed.

2. The electronic system of claim 1, wherein contemporaneously with presenting the video snippet, the controller pauses receiving the respective video feed to reduce a local bandwidth required for the video communication session.

3. The electronic system of claim 1, wherein the controller:
    in response to determining that the local participant is gazing at a specific one of the video snippets, presents a corresponding live video feed in place of the specific video snippet within the participant tile.

4. The electronic system of claim 1, wherein the controller:
    presents a participant gallery having a plurality of participant tiles each corresponding respectively to a participant in the video communication session; and
    in response to detecting a scan by the local participant over a series of participant tiles of the plurality of participant tiles, automatically presents a live view of all of the plurality of participant tiles to facilitate the local participant locating a particular other participant.

5. The electronic system of claim 1, wherein the controller:
presents a participant gallery having a plurality of participant tiles each corresponding respectively to a participant in the video communication session; and
in response to detecting a scan by the local participant over a series of participant tiles of the plurality of participant tiles, automatically presents a listing of all of the participants to facilitate the local participant locating a particular other participant.

6. The electronic system of claim 1, wherein the controller:
tracks interactions between the local participant and the multiple second participants; and
in response to identifying that the local participant is directly interacting with the first participant but not the second participant, presents a live video feed of the first participant and presents the video snippet of the second participant.

7. The electronic system of claim 6, wherein the controller:
enumerate interactions between the local participant and each of the multiple second participants;
ranks each of the multiple second participants based on the enumerated interactions as an indication of likelihood that the local participant would gaze at each of the multiple second participants;
determines a local bandwidth capacity of the video communication session;
based on a respective rank of each of the multiple second participants, downloads and presents a first subset of the more than one video feeds that collectively require less than the local bandwidth capacity; and
presents video snippets of a second subset of the more than one video feeds that have a lower rank than the first subset and exceeding the local bandwidth capacity.

8. The electronic system of claim 1, wherein the controller:
in response to determining that video call data savings mode is enabled, records each video snippet from the more than one video feeds of respective participants in the video communication session.

9. The electronic system of claim 1, wherein the controller periodically re-records a current, more recent version of each video snippet of respective participants in the video communication session and presents the more recent version of the video snippet in order to imitate a live video feed.

10. The electronic system of claim 1, wherein the controller:
in response to determining that a remote participant is speaking, presents a corresponding live video feed of the remote participant in place of a corresponding video snippet within the participant tile.

11. The electronic system of claim 1, further comprising:
a first electronic device comprising the display and a memory that stores a universal device controller client; and
a second electronic device comprising the controller, the communications subsystem, and a memory communicatively coupled to the controller and that stores a universal device controller application, and wherein the controller:
executes the universal device controller application to configure the communications subsystem to support a communication exchange with the first electronic device, which executes the universal device controller client; and
triggers, via the communication exchange, the first electronic device to present the visual content.

12. A method comprising:
connecting, via a communications subsystem of an electronic system over a network, to a video communication session with at least a first electronic device and a second electronic device used respectively by a first participant and a second participant among multiple second participants to participate in the video communication session with a local participant;
presenting visual content on a display to the local participant;
capturing a field of view of at least one image capturing device encompassing at least one eye of the local participant to the video communication session while the local participant is facing the visual content presented by the display;
monitoring eye gaze direction of the local participant positioned in the field of view of the at least one image capturing device;
receiving, via the communications subsystem, and presenting, at the display, more than one video feeds of respective participants in the video communication session; and
in response to determining that at least one video feed is not being gazed at by the local participant:
capturing a video snippet of each of the at least one video feed; and
presenting the video snippet within a participant tile in place of the respective video feed.

13. The method of claim 12, further comprising:
in response to determining that video call data savings mode is enabled, recording each video snippet from the more than one video feeds of respective participants in the video communication session;
contemporaneously with presenting the video snippet, pausing receiving the respective video feed to reduce a local bandwidth required for the video communication session;
in response to determining that the local participant is gazing at a specific one of the video snippets, presenting a corresponding live video feed in place of the specific video snippet within the participant tile; and
in response to determining that a remote participant is speaking, presenting a corresponding live video feed of the remote participant in place of a corresponding video snippet at the participant tile for the remote participant.

14. The method of claim 12, further comprising:
presenting a participant gallery having a plurality of participant tiles each corresponding respectively to a participant in the video communication session; and
in response to detecting a scan by the local participant over a series of participant tiles of the plurality of participant tiles, automatically presenting a live view of all of the plurality of participant tiles to facilitate the local participant locating a particular other participant.

15. The method of claim 12, further comprising:
presenting a participant gallery having a plurality of participant tiles each corresponding respectively to a participant in the video communication session; and
in response to detecting a scan by the local participant over a series of participant tiles of the plurality of participant tiles, automatically presenting a listing of all of the participants to facilitate the local participant locating a particular other participant.

16. The method of claim 12, further comprising:
tracking interactions between the local participant and the multiple second participants; and
in response to identifying that the local participant is directly interacting with the first participant but not the second participant, presenting a live video feed of the first participant and presents the video snippet of the second participant.

17. The method of claim 16, further comprising:
enumerating interactions between the local participant and each of the multiple second participants;
ranking each of the multiple second participants based on enumerated interactions between the local participant and the multiple second participants;
determining a local bandwidth capacity of the video communication session;
based on a respective rank of each of the multiple second participants, downloading and presenting a first subset of the more than one video feeds that collectively require less than the local bandwidth capacity; and
presenting video snippets of a second subset of the more than one video feeds that have a lower rank than the first subset and that exceed the local bandwidth capacity.

18. The method of claim 12, further comprising periodically re-recording each video snippet based on the more than one video feeds of respective participants in the video communication session to emulate a live video presentation.

19. The method of claim 12, wherein:
a first electronic device comprises the display and a memory that stores a universal device controller client;
a second electronic device comprises the controller, the communications subsystem, and a memory communicatively coupled to the controller and that stores a universal device controller application; and
presenting the visual content on the display to the local participant further comprises:
executing a universal device controller application by a controller of a second electronic device to configure the communications subsystem to support a communication exchange with a first electronic device having the display, which executes a universal device controller client; and
triggering, via the communication exchange, the first electronic device to present the visual content.

20. A computer program product comprising:
a computer readable storage device; and
program code on the computer readable storage device that when executed by a processor associated with an electronic device, the program code enables the electronic device to provide functionality of:
connecting, via a communications subsystem over a network, to a video communication session with at least a first electronic device and a second electronic device used respectively by a first participant and a second participant among multiple second participants to participate in the video communication session with a local participant;
presenting visual content on a display to a local participant;
capturing a field of view of at least one image capturing device encompassing at least one eye of the local participant to the video communication session while the local participant is facing the visual content presented by the display;
monitoring eye gaze direction of the local participant positioned in the field of view of the at least one image capturing device;
receiving, via the communications subsystem, and presenting, at the display, more than one video feeds of respective participants in the video communication session; and
in response to determining that at least one video feed is not being gazed at by the local participant:
capturing a video snippet of each of the at least one video feed; and
presenting the video snippet within a participant tile in place of the respective video feed.

* * * * *